United States Patent Office 3,778,462
Patented Dec. 11, 1973

3,778,462
OLEFIN HYDROCYANATION REACTION

Brian W. Taylor, Richland Township, Allegheny County, and Harold E. Swift, Gibsonia, Allegheny County, Pa., assignors to Gulf Research & Development Company, Pittsburgh, Pa.
No Drawing. Filed June 7, 1971, Ser. No. 150,784
Int. Cl. C07c *121/04*
U.S. Cl. 260—465.3        9 Claims

ABSTRACT OF THE DISCLOSURE

Hydrocyanation of a non-conjugated olefin such as hexene-1 occurs in the presence of a catalyst system comprising a zero valent nickel complex, free of carbon monoxide, and a promoting amount of a cation of a metal such as zinc chloride using as a solvent an aryl hydrocarbon containing at least one hydroxyl group directly connected to a ring carbon atom such as para-cresol.

---

This invention relates to the hydrocyanation of ethylenically unsaturated hydrocarbon molecules having from 2 to 20 carbon atoms per molecule using a promoted nickel complex catalyst and a novel solvent.

The addition of hydrogen cyanide to double bonds adjacent to activating groups, such as a nitrile or a carboxy group, proceeds with relative ease. However, the addition of hydrogen cyanide to nonactivated double bonds such as those present in alpha-olefins proceeds only with difficulty, if at all. Drinkard, Jr. et al. has suggested the use of certain salts as promoters for the hydrocyanation reaction involving unactivated olefins in U.S. Pat. No. 3,496,-217, issued Feb. 17, 1970. In this reference, Drinkard et al. suggest the hydrocyanation reaction can be carried out with or without a solvent, and those solvents suggested include benzene or xylene or nitriles such as acetonitrile or benzonitrile. The prior art processes suffer particularly from poor catalyst lifetimes or from poor reaction rates or both.

It is one of the objectives of this invention to improve the overall catalyst reaction rate and to improve the catalyst lifetime in a process for the addition of hydrogen cyanide to olefinically unsaturated hydrocarbons, especially alpha-olefins.

In accordance with the invention, an improved process has been discovered for the hydrocyanation of non-conjugated olefinically unsaturated compounds having from 2 to 20 carbon atoms per molecule and having at least one ethylenic carbon to carbon double bond which comprises reacting HCN with at least one of said olefinically unsaturated compounds under hydrocyanation conditions in the presence of a catalyst system comprising a zero valent nickel complex free of carbon monoxide, a promoting amount of a cation of a metal selected from the group consisting of zinc, cadmium, beryllium, aluminum, gallium, indium, silver, titanium, zirconium, hafnium, germanium, tin, vanadium, niobium, scandium, chromium, molybdenum, tungsten, manganese, rhenium, palladium, thorium, erbium, iron and cobalt and a solvent comprising an aryl hydrocarbon containing at least one hydroxyl group directly connected to a ring carbon atom. An organo cyano compound is recovered. The cyano compound is, of course, derived from said non-conjugated nonactivated olefinically unsaturated compound by the addition of hydrogen cyanide to the ethylenic carbon-carbon bond unsaturation thereof.

The charge stock for the process of this invention may be any non-conjugated nonactivated unsaturated compound having from 2 to 20 carbon atoms per molecule and having at least one ethylenic carbon to carbon double bond. By a "nonactivated unsaturated compound" is meant an olefinic compound selected from the class consisting of aliphatic, cycloaliphatic, and aromatic hydrocarbons and aliphatic and aromatic hydrocarbons containing substituents selected from the group consisting of —C≡N;

and

wherein each open bond of said substituent is directly connected to a hydrogen atom or to an aliphatic or aromatic hydrocarbon group, and wherein the carbon to carbon double bond is separated from any of the aforementioned substituents by at least one carbon atom. Particularly preferred as charge stocks are the non-conjugated unsaturated aliphatic hydrocarbons having from 2 to 10 carbon atoms per molecule and having at least one ethylenic carbon to carbon double bond. Of these latter compounds the most preferred charge stocks are the so-called aliphatic alpha-monoolefins. Examples of suitnon-conjugated nonactivated unsaturated compounds suitable for use in the process of this invention include, but are not limited to:

ethylene;
propylene;
butene-1;
pentene-2;
hexene-1;
hexene-2;
hexene-3;
octene-1;
decene-1;
tetradecene-1;
octadecene-1;
styrene;
alpha-methylstyrene;
3-pentenenitrile;
2-methyl-3-butenenitrile;
1,5-hexadiene;
crotonic acid;
methyl crotonate;
4-cyano-cyclohexane;
1,4-cyclohexadiene; and
cyclohexene The above charge stocks are reacted with HCN to produce nitriles and dinitriles under hydrocyanation conditions using a catalyst ssytem which is described in the prior art.

The catalysts for use in the process of this invention are suitably those disclosed in U.S. Pat. No. 3,496,217 to William Charles Drinkard, Jr. et al. in column 2, line 31 through column 3, line 60. These catalysts are generally zero valent nickel complexes which are free of carbon monoxide and which may be preformed or prepared in situ. These nickel complexes include nickel compounds containing ligands such as alkyl or aryl (either of which contains from 1 to 18 carbon atoms) phosphines; arsines; stibines; phosphites; arsenites and mixtures thereof.

A preferred form of the nickel complexes has the general formula:

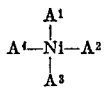

where $A^1$, $A^2$, $A^3$ and $A^4$ are neutral ligands which may be the same or different and have the formula P(XYZ) wherein X and Y are selected from the class consisting of R and OR, and Z has the formula OR, wherein the three R's may be the same or different, and wherein R is selected from the class consisting of alkyl and aryl groups containing up to 18 carbon atoms with aryl being preferred. An especially preferred class of R's are

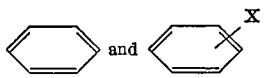

wherein X is selected from the class consisting of Cl, $OCH_3$ and $CH_3$. If desired, any of the R's may be co-joined where possible. Thus the preferred neutral ligands of this group are the aryl phosphites such as triphenyl phosphite, tri(m- and p-chlorophenyl)phosphite, tri(m- and p-methoxyphenyl)phosphite and tri(m- and p-cresyl) phosphite and mixtures thereof. Under many of the reaction conditions one or more $A^1$, $A^2$, $A^3$ or $A^4$ may become disassociated from the nickel.

The ligands useful in forming the catalyst here may be defined as any atoms or molecules capable of functioning as a sigma-pi bonded partner in one or more coordinate bonds. A description of such ligands may be found in Advanced Inorganic Chemistry by F. Albert Cotton and G. Wilkinson, published by Interscience Publishers, a division of John Wiley & Sons, Library of Congress Catalog Card No. 62–14818; particularly on pages 602–606.

Satisfactory techniques for preparing these nickel compounds may be found in French Pat. No. 1,297,934, granted on May 28, 1962 to Reginald Francis Clark et al., which French patent is stated to be equivalent to U.S. Pat. No. 3,328,443, issued June 27, 1967 to Reginald F. Clark et al. Other techniques for preparing these catalysts are described by J. Chatt and F. A. Hart in Chem. Soc. Journal (London), pages 1378–1389 (1960) and by Lewis S. Meriwether and Marylin L. Fiene, JACS, 81, 4200–4209 (1959).

In many instances, it is advantageous to have an excess of certain neutral ligands present with respect to the nickel complex. The preferred excess ligands are the aryl phosphites wherein the aryl groups contain up to 18 carbon atoms. Generally, the excess ligand is present in at least a two molar excess as based on the nickel present. The only limit of excess ligand involves practical considerations for it may even be used as the solvent. However, generally there is little advantage to be obtained in using over a 300 mole excess of ligand as based on one mole of nickel. The preferred triaryl phosphites for use as excess ligand are triphenyl phosphite, tri(m- and p-methoxyphenyl) phosphite and tri(m- and p-cresyl)phosphite, and mixtures thereof.

The primary benefit obtained by the use of the excess ligand is to extend the life of the catalyst, and this is quite important from the commercial viewpoint. Further increases in catalyst lifetime are achieved using the solvents of this invention. The excess ligands which are employed may be the same or different from the ligands used to form the nickel catalyst. If the excess ligands are different from those used to form the nickel catalyst, an equilibrium among the ligands will take place.

The nickel compounds may also be made in situ, such as by the addition of nickel carbonyl and a neutral ligand to the reaction mixture, such as tritolylphosphite. A second technique involves adding the neutral ligand (as defined above), a nickel (II) compound such as a nickel halide, e.g., $NiCl_2$, $Ni(CN)_2$, or bis(acetylacetonato)nickel (II) and a source of hydride ions. Suitable sources of H⁻ ions are compounds of the structure $M'[BH_4]_x$, $M'[AlH_4]_x$, $H_2$, and $M'H_x$ where M' is an alkali metal or an alkaline earth metal and $x$ is a number corresponding to the valence of the metal. A third technique is to add dicyclopentadienyl nickel to a neutral ligand such as $M(OR)_3$ where M is As, P or Sb and R is aryl, to the reaction mixture. In each case, the catalyst is formed under the hydrocyanation reaction conditions hereinafter described and no other special temperatures or pressures need be observed.

A promoter for the nickel complex catalyst of this invention is also employed, said promoter being a compound containing a cation of a metal selected from the class consisting of zinc, cadmium, beryllium, aluminum, gallium, indium, silver, titanium, zirconium, hafnium, germanium, tin, vanadium, niobium, scandium, chromium, molybdenum, tungsten, manganese, rhenium, palladium, thorium, erbium, iron and cobalt, or mixtures thereof. Preferably the compound should be at least partially soluble in the system, and also, preferably, should not have an oxidizing tendency since this generally results in at least partial loss of the nickel catalyst.

The anion portion of the compound is preferably selected from the class consisting of halide, i.e. fluoride, chloride, bromide, and iodide; anions of lower fatty acids of from 2 to 7 carbon atoms, $HPO_3^{-2}$, $H_2PO_2^-$, $CF_3COO^-$, $OSO_2C_7F_{15}^-$ and $SO_4^-$, etc. Useful organometallic compounds include $(C_2H_5)_3Al_2Cl_3$ and $C_2H_5AlCl_2$. The promoter acts to improve the number of cycles and, in certain cases, the yield and rate. The amount of promoter used generally can be varied from about 1:16 to 50:1 molar ratio of promoter to catalyst. The promoter may be used according to several techniques. Thus, while at least some of the promoter may be added to the reaction mixture at the start of the reaction, additional amounts may be added at any point in time during the reaction.

Usually the hydrocyanation reaction is operated batch style by charging a reactor with all of the reactants including the catalyst or catalyst components, the unconjugated unsaturated charge stock, the catalyst promoter and the solvent to be defined. The hydrogen cyanide gas may be swept over the surface of the reaction mixture or bubbled through. The reaction mixture is preferably agitated by stirring or other means. The molar ratio of the olefinic charge stock to the catalyst (not including the promoter) is generally varied from about 10:1 to 2000:1. A continuous operation may also be employed, for example, by passage of a mixture of charge stock and catalyst downwardly through a reaction zone while hydrogen cyanide gas is passed upwardly through the reaction zone, and product is recovered at the bottom. In a continuous type of operation the proportion of catalyst is much higher, being on the order of one mole of olefin to five moles of catalyst. The products may be recovered by any suitable conventional technique, such as distillation.

In accordance with the invention, the above hydrocyanation reaction is carried out in the presence of a unique solvent which results in a longer catalyst life and increased efficiencies of operation. The solvent is an aryl compound containing from six to 20 carbon atoms per molecule and containing at least one hydroxyl group directly connected to a ring carbon atom. The solvent can suitably contain from one to three aromatic rings which may be condensed or uncondensed. The solvent may also contain substituents selected from the group consisting of halogens including fluorine, chloride, bromine, iodine, $-NO_2$, $-C \equiv N$, and a hydrocarbon radical having from 1 to 6 carbon atoms. Preferably the solvent is an aryl hydrocarbon containing from 6 to 10 carbon atoms, a single ring and from one to two hydroxyl groups directly connected to ring carbon atoms.

Examples of suitable solvents include, but are not limited to:

phenol;
o-cresol;
m-cresol;
p-cresol;
dihydroxy benzenes such as resorcinol;
dihydroxy toluenes such as alpha-naphthol;
beta-naphthol;
monohydroxy biphenyls such as para-hydroxy biphenyl;
dihydroxy biphenyls such as para,para-dihydroxy biphenyl;
p-chlorophenol;
p-nitrophenol;
2-methyl-5-nitro-phenol;
2-cyano-1,4-dihydroxybenzene;
xylenols such as 2-hydroxy-p-xylene;
p-butylphenol; and
m-hexylphenol Some of the above solvents are solids at ambient conditions and if lower temperature operation is desired and/or if a gaseous olefin feed is employed, then a solvent which is liquid under reaction conditions must obviously be chosen.

The weight ratio of solvent to olefinic charge stock may be from 0.2:1 to 20:1; but usually the weight ratio of solvent to charge stock is from 1:1 to 10:1. The larger amounts of solvent can be employed but only at the expense of reduced space-time-yield of products from a given size reactor.

The hydrocyanation reaction proceeds under well known hydrocyanation conditions. The temperature is not critical and the particular temperature chosen may depend to some extent on the particular catalyst and olefinic charge stock employed, considering, of course, the desired rate of reaction. Generally temperatures from $-25°$ C. to $200°$ C. can satisfactorily be employed, with temperatures from $0°$ to $150°$ C. being preferred. Reaction pressure is likewise not critical, and atmospheric pressure is suitable. Lower or higher pressures can also be employed, such as from 0.05 to 100 atmospheres, although these higher pressures serve no particular purpose.

The nitriles formed by the present invention are useful as chemical intermediates. For instance, adiponitrile is an intermediate used in the production of hexamethylene diamine, which in turn is used in the production of polyhexamethylene adipamide, a commercial polyamide useful in forming fibers, films and molded articles. Other nitriles can be used to form the corresponding acids and amines which are conventional commercial products.

The invention will be further described with reference to the following experimental work.

In the experimental work to follow, the olefinic reactants were either hexene-1 or octene-1 and these were initially dried by passage through 5 A. molecular sieves and the product further distilled under a nitrogen atmosphere. The solvents employed included acetonitrile, toluene or para-cresol. These solvents were similarly dried and distilled, but in the case of para-cresol vacuum distillation was employed.

The hydrogen cyanide which was purchased was found to contain sulfur dioxide and sulfuric acid stabilizers, and these stabilizers had a detrimental effect on the catalyst for the reaction. The hydrogen cyanide was thereafter purified by purging at $0°$ C. with dry nitrogen to remove the $SO_2$ followed by distillation from the sulfuric acid. The pure product was collected over the boiling range $27°$ C. to $28°$ C. Stabilization against polymerization was affected by the addition of a small amount of phosphoric acid which, unlike the $SO_2$ and sulfuric acid, was not detrimental to the hydrocyanation catalyst.

Two different hydrocyanation catalysts were employed, the first being tetrakis(tri-p-tolylphosphite)nickel(O), and the second being tetrakis(triethylphosphite)nickel(O). The first catalyst was prepared by the method of Clark and Storrs in French Pat. No. 1,297,934, while the second catalyst was prepared by the method of Vinal and Reynolds disclosed in an article in Inorganic Chemistry 3, 1062 (1964).

In all of the experiments in Table I and Example 1 below, the following procedure was employed: tetrakis(tri-p-tolylphosphite)nickel(O) (1.4 grams; 0.001 moles), anhydrous zinc chloride (0.27 grams; 0.002 moles) and tri-p-tolylphosphite (1.5 ml.; 0.005 moles) were charged to a reaction flask under heavy nitrogen purge. Hexene-1 (25 ml.; 0.2 moles) and 25 ml. of the particular solvent used were then added and the mixture heated with stirring to $60°$ C. When equilibrium temperature had been reached, the HCN was continuously fed into the reaction mixture at a rate of 20 moles of HCN per hour per mole of nickel catalyst by passing a stream of dry nitrogen through a trap containing liquid HCN at $0°$ C. After a given time period, analysis of the amount of nitriles produced was made by G.L.C. From this information, the selectivity to the product of heptanenitrile as shown in Table I was calculated. Gas chromatographic analysis was performed on a 10-foot column (10 percent SE–30 on chromosorb W).

The identity of the products was established by IR and N.M.R. measurements.

A series of runs was made to show the effect of solvent on the selectivity of the conversion of hexene-1 to heptanenitrile. The experiments are summarized in Table I below.

TABLE I.—SELECTIVITY TO HEPTANENITRIDE [1]

| Time (hrs.) | Acetonitrile | Toluene | Phenol |
|---|---|---|---|
| 0.25 | 80.2 | 92.0 | |
| 0.50 | 79.5 | 92.6 | 91.9 |
| 1.0 | 78.5 | | 88.3 |
| 1.5 | | 90.1 | |
| 2.0 | 78.6 | 88.8 | 87.5 |
| 3.0 | 77.1 | 87.9 | 87.2 |
| 4.0 | 78.0 | 87.6 | |
| 4.5 | | | 86.0 |
| 5.0 | 78.0 | 87.6 | |

[1] This means selectivity to straight-chain products rather than branched chain products. Selectivity is calculated by dividing the number of moles of straight-chain nitrile produced by the total number of moles of nitrile produced times 100.

Referring to Table I above, the strong effect of solvent on selectivity is not easy to explain. It appears that increased selectivity to heptanenitrile is favored by solvents of lower dielectric constant. Further, the data in Table I show that both toluene and phenol are much better solvents than acetonitrile from a selectivity standpoint.

EXAMPLE 1

A run similar to the runs in Table I was made, except using para-cresol as the solvent. After five hours, the selectivity to the formation of heptanenitrile was 86.0 mole percent.

In addition to selectivity, however, it is important to simultaneously achieve an extended catalyst lifetime and reaction rate or both from a commercial standpoint.

EXAMPLE 2

The following reagents were added to a reaction flask under a dry nitrogen purge: tetrakis(tri-p-tolylphosphite) nickel (1.4 grams), anhydrous zinc chloride (0.27 grams), tri-p-tolylphosphite (1.5 ml.), p-cresol (25 ml.) and 1-hexene (37.5 ml.). The mixture was heated to $60°$ C. and HCN introduced by bubbling dry nitrogen through a trap containing liquid HCN at $0°$ C. The progress of the reaction was followed by gas-liquid chromatography. Additional amounts of 1-hexene were added as it was consumed during the reaction (25 ml. at 24 hours, and 12.5 ml. at 48 hours). After 72 hours no further product was formed due to catalyst deactivation. Product analysis by gas-liquid chromatography showed that 547 moles of nitrile were produced per mole of nickel catalyst charged, i.e. 547 catalyst cycles were achieved.

EXAMPLE 3

The following reagents were charged to a reaction flask under a dry nitrogen purge: tetrakis(tri-p-tolylphosphite)nickel (1.4 grams), anhydrous zinc chloride (0.27 grams), tri-p-tolylphosphite (1.5 ml.), acetonitrile (25 ml.) and 1-hexene (37.5 ml.). The mixture was heated to 60° C. and HCN introduced at the same rate and in the same manner as in Example 1. The progress of the reaction was followed by gas-liquid chromatography. Additional amounts of 1-hexene were added as it was consumed during the reaction (12.5 ml. after 24 hours). After 48 hours no further product was formed due to catalyst deactivation. Product analysis by gas-liquid chromatography showed that 101 moles of product nitrile were formed per mole of nickel catalyst charged, i.e. 101 catalyst cycles were achieved.

Referring to Examples 2 and 3 above, it can be seen that only 101 cycles were achieved in the case where acetonitrile was used as the solvent, whereas 547 cycles were achieved when para-cresol was used as the catalyst. By a "cycle" is meant the number of moles of nitrile product produced for each mole of nickel catalyst consumed. While it is not certain, it is believed that when the phenolic solvents of the present invention are employed, the desired reactions are speeded up while the undesired reactions are not, and thus an increased amount of nitrile product per mole of nickel consumed is achieved.

Table II below summarizes data on the rate of formation of heptanenitrile as a function of the HCN feed rate and the type of solvent employed. These runs were made in the same manner as described above for the runs in Table I except for the HCN feed rate.

TABLE II

| Toluene | | p-Cresol | | Acetonitrile | |
| --- | --- | --- | --- | --- | --- |
| HCN feed rate [1] | Rate of product formation | HCN feed rate | Rate of product formation | HCN feed rate | Rate of product formation |
| 6.0 | 4.0 | 3.1 | 2.5 | 10.4 | 6.0 |
| 12.4 | 12.0 | 15.0 | 14.0 | 20.0 | 11.6 |
| 19.2 | 12.2 | 20.0 | 20.0 | | |
| 34.0 | 14.4 | 36.0 | 25.0 | 37.0 | 16.0 |
| 37.0 | 13.3 | 48.0 | 25.0 | 62.0 | 17.0 |
| 46.0 | 10.0 | 60.0 | 15.0 | | |

[1] All rates are in moles/hour/mole of nickel catalyst.

Excess HCN is known to deactivate the catalyst. It is preferred to add HCN at a rate at which it is consumed. As shown in Table II, the rate of addition of HCN can be increased using the solvents of this invention and thus an improved operation results.

Referring to Table II, it can be seen that the rate of formation of heptanenitrile is clearly much faster in para-cresol as the solvent rather than toluene or acetonitrile for HCN feed rates between about 20 and 55 moles per hour per mole of catalyst.

Similar experiments were run as in Table II with ortho- and meta-cresol as the solvents, and substantially the same results were achieved.

Example 1 was repeated using octene-1 in place of hexene-1, and hydrocyanation occurred at a lower rate.

Resort may be had to such variations and modifications as fall within the spirit of the invention and the scope of the appended claims.

We claim:

1. In a process for hydrocyanating an ethylenic carbon to carbon double bond of a non-acetylenic, non-conjugated, non-activated olefinically unsaturated compound having from 2 to 20 carbon atoms per molecule, the unsaturated compound being selected from the class consisting of aliphatic, cycloaliphatic and aromatic hydrocarbons and aliphatic and aromatic hydrocarbons containing substituents selected from the group consisting of —C≡N;

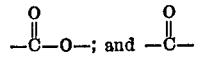

wherein each open bond of said substituent is directly connected to a hydrogen atom or to an aliphatic or aromatic hydrocarbon group and wherein the carbon to carbon double bond is separated from any of the aforementioned substituents by at least one carbon atom;

which comprises contacting the unsaturated compound with hydrogen cyanide at a temperature from —25° C. to 200° C. in the contact presence of a zero valent nickel complex, free of CO, having the formula:

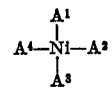

where $A^1$, $A^2$, $A^3$ and $A^4$ are neutral ligands which may be the same or different and have the formula P(XYZ) wherein X and Y are selected from the class consisting of R and OR, and Z has the formula OR, wherein the three R's may be the same or different and wherein R is selected from the class consisting of alkyl and aryl groups containing up to 18 carbon atoms;

and a promoting amount of a compound containing a metal selected from the group consisting of zinc, cadmium, beryllium, aluminum, gallium, indium, silver, titanium, zirconium, hafnium, germanium, tin, vanadium, niobium, scandium, chromium, molybdenum, tungsten, manganese, rhenium, palladium, thorium, erbium, iron and cobalt;

and wherein the molar ratio of said promoter to the nickel complex is from 1:16 to 50:1;

and wherein the molar ratio of the olefinically unsaturated compound to the nickel complex is from 10:1 to 2000:1;

and recovering an organic nitrile derived from the olefinically unsaturated compound by addition of hydrogen cyanide to the ethylenic carbon to carbon unsaturation thereof; the improvement which comprises reacting said unsaturated compound with hydrogen cyanide in the added presence of a solvent, said solvent being a mono- or dihydroxy ring substituted aryl hydrocarbon compound or said hydroxy substituted compound further ring substituted only with one to two halogen, —NO₂ —C≡N, or alkyl hydrocarbon radicals having from 1 to 6 carbon atoms;

and wherein the weight ratio of said aryl hydrocarbon compound to said olefinically unsaturated compound is from 0.2:1 to 20:1.

2. A process according to claim 1 wherein the promoter compound contains a cation of a metal selected from the group consisting of zinc, cadmium, beryllium, aluminum, gallium, indium, silver, titanium, zirconium, hafnium, germanium, tin, vanadium, niobium, scandium, chromium, molybdenum, tungsten, manganese, rhenium, palladium, thorium, erbium, iron and cobalt;

and wherein the anion portion of said compound is at least one anion selected from the class consisting of halide, lower fatty acids having from 2 to 7 carbon atoms per molecule, $HPO_2^{-2}$, $H_2PO_2^-$, $CF_3COO^-$, $OSO_2C_7F_{15}^-$, $C_2H_5^-$, and $SO_4^-$.

3. A process in accordance with claim 2 where X and Y have the formula OR.

4. A process in accordance with claim 2 wherein said solvent has from 6 to 10 carbon atoms and a single ring.

5. A process in accordance with claim 4 wherein said solvent is at least one compound selected from o-cresol, m-cresol and p-cresol.

6. A process in accordance with claim 4 wherein the solvent is phenol.

7. A process in accordance with claim 4 wherein the charge stock is a non-acetylenic, non-conjugated unsaturated aliphatic hydrocarbon having from 2 to 10 carbon atoms per molecule and having at least one ethylenic carbon to carbon double bond.

8. A process in accordance wtih claim 7 wherein the charge stock is hexene-1 and the solvent is at least one compound selected from o-cresol, m-cresol and p-cresol.

9. A process in accordance with claim 7 wherein the metal cation is a cation of zinc.

References Cited
UNITED STATES PATENTS
3,655,723  4/1972  Drinkard, Jr. _____ 260—465.3

JOSEPH PAUL BRUST, Primary Examiner

U.S. Cl. X.R.
260—464, 465 C, 465.1, 465.4, 465.8 R